(12) United States Patent
Thomas

(10) Patent No.: US 10,193,944 B2
(45) Date of Patent: Jan. 29, 2019

(54) SYSTEMS AND METHODS FOR MULTI-DEVICE MEDIA BROADCASTING OR RECORDING WITH ACTIVE CONTROL

(71) Applicant: Q Technologies Inc., Atlanta, GA (US)

(72) Inventor: Marcus Allen Thomas, Atlanta, GA (US)

( * ) Notice: Subject to any disclaimer, the term of this patent is extended or adjusted under 35 U.S.C. 154(b) by 0 days.

(21) Appl. No.: 15/624,470

(22) Filed: Jun. 15, 2017

(65) Prior Publication Data

US 2017/0366591 A1     Dec. 21, 2017

Related U.S. Application Data

(60) Provisional application No. 62/351,909, filed on Jun. 17, 2016, provisional application No. 62/355,620, filed on Jun. 28, 2016.

(51) Int. Cl.

| | |
|---|---|
| *H04N 21/262* | (2011.01) |
| *H04N 21/236* | (2011.01) |
| *H04L 29/06* | (2006.01) |
| *H04L 29/08* | (2006.01) |
| *H04N 21/2343* | (2011.01) |
| *H04N 21/2365* | (2011.01) |
| *H04N 21/2665* | (2011.01) |
| *H04N 21/2668* | (2011.01) |
| *H04N 21/845* | (2011.01) |
| *H04N 21/854* | (2011.01) |

(52) U.S. Cl.
CPC .............. *H04L 65/60* (2013.01); *H04L 67/06* (2013.01); *H04N 21/236* (2013.01); *H04N 21/2365* (2013.01); *H04N 21/23439* (2013.01); *H04N 21/2665* (2013.01); *H04N 21/2668* (2013.01); *H04N 21/26258* (2013.01); *H04N 21/845* (2013.01); *H04N 21/8456* (2013.01); *H04N 21/854* (2013.01)

(58) Field of Classification Search
CPC .... H04N 21/236; H04N 21/234; H04L 65/60; H04L 67/06
See application file for complete search history.

(56) References Cited

U.S. PATENT DOCUMENTS

| 7,934,010 B2* | 4/2011 | Foster ............... H04L 29/06027 709/230 |
| 8,234,350 B1* | 7/2012 | Gu .................... H04N 21/23430 709/203 |
| 8,762,564 B1* | 6/2014 | Philpott .............. H04L 65/4084 709/217 |

(Continued)

*Primary Examiner* — Brian T Pendleton
*Assistant Examiner* — Frank Johnson
(74) *Attorney, Agent, or Firm* — Foley & Lardner LLP; John Lanza

(57) ABSTRACT

A controller may preview media streams from a plurality of source devices, and may select between the streams, add processing or additional content to the streams, and provide an edited or mixed stream to one or more client or recipient devices. In many implementations, mixing or selective presentation of streams may be accomplished with little to no delay via a lightweight signaling and chunk identification change protocol. In other implementations, processing and mixing instructions may be provided to client devices, which may retrieve the streams and process them locally, reducing or eliminating delay from an intermediary processor or mixer.

16 Claims, 12 Drawing Sheets

(56) References Cited

U.S. PATENT DOCUMENTS

| | | | | |
|---|---|---|---|---|
| 8,959,241 B2* | 2/2015 | Gupta | H04N 21/8456 | 709/231 |
| 9,066,138 B1* | 6/2015 | Kraiman | H04N 21/458 | |
| 9,716,920 B2* | 7/2017 | Chen | H04N 19/597 | |
| 9,749,375 B2* | 8/2017 | Wang | H04L 65/4092 | |
| 2003/0122924 A1* | 7/2003 | Meyers | H04L 29/06027 | 348/14.11 |
| 2010/0162330 A1* | 6/2010 | Herlein | G11B 27/034 | 725/93 |
| 2011/0307781 A1* | 12/2011 | Sood | G11B 27/34 | 715/716 |
| 2012/0047542 A1* | 2/2012 | Lewis | H04N 21/44016 | 725/97 |
| 2012/0150953 A1* | 6/2012 | Costanzo | H04L 29/06027 | 709/203 |
| 2012/0198031 A1* | 8/2012 | Bouazizi | H04L 65/4084 | 709/219 |
| 2012/0265892 A1* | 10/2012 | Ma | H04N 21/23418 | 709/231 |
| 2013/0188922 A1* | 7/2013 | Furbeck | H04N 5/772 | 386/239 |
| 2014/0040026 A1* | 2/2014 | Swaminathan | G06Q 30/02 | 705/14.53 |
| 2014/0150019 A1* | 5/2014 | Ma | G06Q 30/0251 | 725/34 |
| 2014/0280746 A1* | 9/2014 | Johns | H04L 67/06 | 709/219 |
| 2014/0359470 A1* | 12/2014 | Lin | G06F 17/30053 | 715/745 |
| 2014/0379871 A1* | 12/2014 | Van Brandenburg | H04L 65/4084 | 709/219 |
| 2016/0286244 A1* | 9/2016 | Chang | H04N 21/21805 | |
| 2017/0199874 A1* | 7/2017 | Patel | G06F 17/30041 | |
| 2018/0097864 A1* | 4/2018 | Brinkley | H04L 65/4084 | |

* cited by examiner

| Manifest 400 | | |
|---|---|---|
| Chunk # 1 | Chunk ID 402a | Time 404a |
| Chunk # 2 | Chunk ID 402b | Time 404b |
| Chunk # 3 | Chunk ID 402c | Time 404c |
| Chunk # n | Chunk ID 402n | Time 404n |

*FIG. 4A*

SYSTEMS AND METHODS FOR MULTI-DEVICE MEDIA BROADCASTING OR RECORDING WITH ACTIVE CONTROL

RELATED APPLICATIONS

The present application claims priority to and the benefit of U.S. Provisional Application No. 62/351,909, entitled "Systems and Methods for Multi-Device Video Capturing using a Controlling Device," filed Jun. 17, 2016; and U.S. Provisional Application No. 62/355,620, entitled "Systems and Methods for Multi-Device Media Broadcasting or Recording with Active Control," filed Jun. 28, 2016; the entirety of each of which are hereby incorporated by reference.

FIELD

The present application relates to systems and methods for broadcasting media from a plurality of media capture devices.

BACKGROUND

Streaming of media, such as audio and video, allows a media source to unicast or broadcast to one or more receipt devices. In many instances, the media may be pre-recorded, allowing processing and selection or mixing of multiple sources (e.g. microphones, cameras, etc.). However, where media is provided live or in real-time, it may be difficult to mix or select between sources without substantial delays.

SUMMARY

The present disclosure describes systems and methods for multi-device media broadcasting with active control. A controller may preview media streams from a plurality of source devices, and may select between the streams, add processing or additional content to the streams, and provide an edited or mixed stream to one or more client or recipient devices. In many implementations, mixing or selective presentation of streams may be accomplished with little to no delay via a lightweight signaling and chunk identification change protocol. In other implementations, processing and mixing instructions may be provided to client devices, which may retrieve the streams and process them locally, reducing or eliminating delay from an intermediary processor or mixer.

BRIEF DESCRIPTION OF THE FIGURES

FIG. 4A is an illustration of an implementation of a manifest for streaming media;

In the drawings, like reference numbers generally indicate identical, functionally similar, and/or structurally similar elements.

DETAILED DESCRIPTION

Figure 1A:
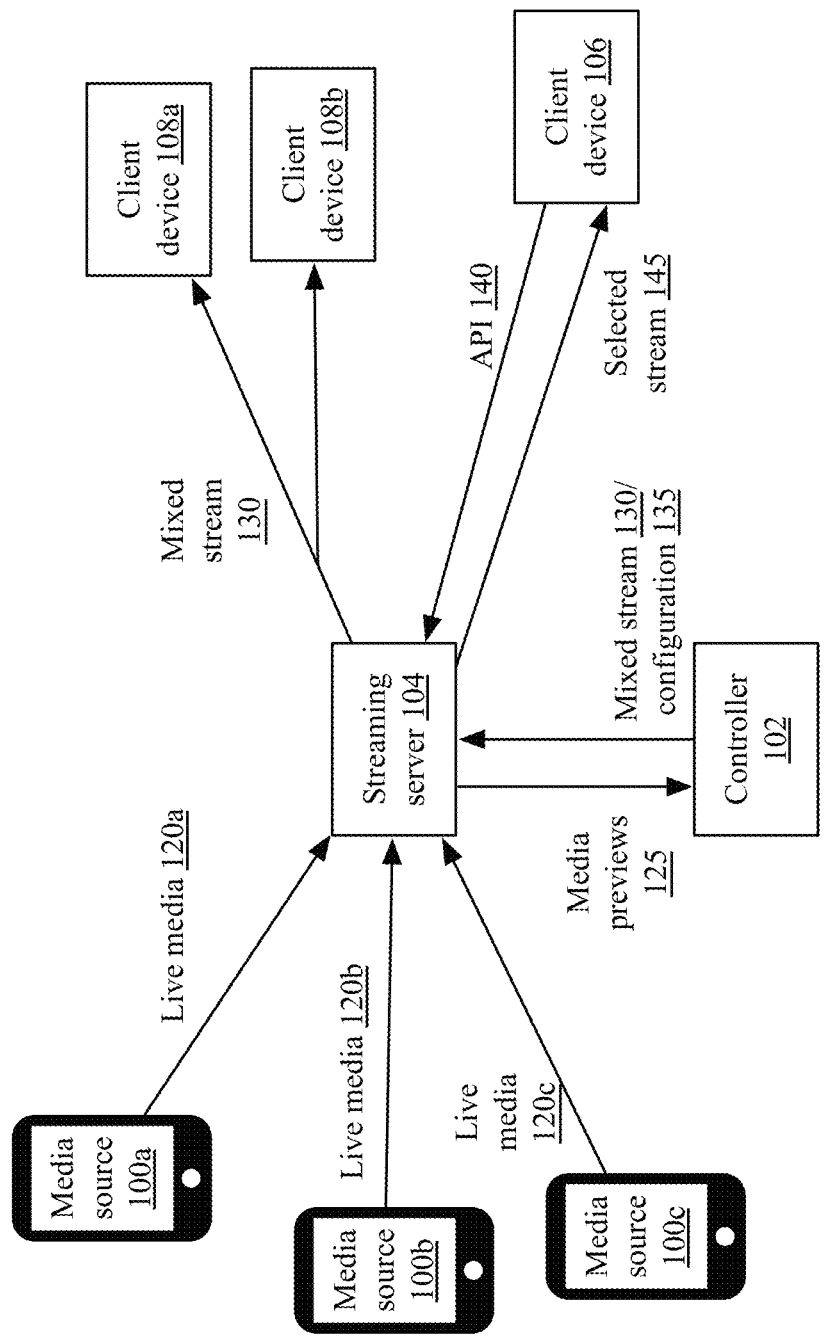
FIG. 1A is a block diagram of an embodiment of a multi-device media broadcasting system with active control provided by an implementation of a controller.

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Streaming of media, such as audio and video, allows a media source to unicast or broadcast to one or more receipt devices. In many instances, the media may be pre-recorded, allowing processing and selection or mixing of multiple sources (e.g. microphones, cameras, etc.). However, where media is provided live or in real-time, it may be difficult to mix or select between sources without substantial delays. For example, many individuals carry smart phones, tablet computing devices, wearable computing devices, or other devices that include a camera and/or microphone and a wireless network interface (e.g. 802.11 "WiFi"; cellular, etc.). "Citizen journalists" may capture multiple angles of a news or sporting event and provide live media streams from different perspectives. In other implementations, a media organization may send out a number of reporters with similar devices to capture interviews, action, stock or environmental footage, or other such media. In still other implementations, a media organization may wish to stream media from a mix of high definition cameras at installed locations, portable cameras from roving journalists, audience member-provided live media, or other content. Traditionally, while methods exist for streaming from a single device, to mix multiple streams of media, each stream would have to be provided to a mixing or processing device, which would then provide a "master" output stream. For example, a plurality of cameras may stream media to a video mixer, which may buffer the received media; select, process, and/or mix the buffered media into a single stream; and transmit the stream to a cloud server or one or more client or recipient devices. This may incur significant delay as the mixing device has to buffer, decode, mix, and encode the output stream, impacting the "live" nature of streamed media. This may particularly impact instances where audience members of an event may see both live action and received media streams (e.g. on smart phones) from close up cameras. If the media stream has more than a small amount of delay, the stream may be useless, undesirable, or frustrating for the user.

Accordingly, the present disclosure describes systems and methods for multi-device media broadcasting with low-latency active control. A controller may preview media streams from a plurality of source devices, and may select between the streams, add processing or additional content to the streams, and provide an edited or mixed stream to one or more client or recipient devices. In many implementations, mixing or selective presentation of streams may be accomplished with little to no delay via a lightweight signaling and chunk identification change protocol. In other implementations, processing and mixing instructions may be provided to client devices, which may retrieve the streams and process them locally, reducing or eliminating delay from an intermediary processor or mixer.

FIG. 1A is a block diagram of an embodiment of a multi-device media broadcasting system with active control provided by an implementation of a controller 102. A plurality of media sources 100a-100c (referred to generally as media source(s) or source device(s) 100) may provide a corresponding plurality of media streams 120-120c (referred to generally as media stream(s) 120). The media sources 100 may be cameras, microphones, smart phones, tablets, wearable computing devices, laptop computing devices, video encoders, audio or video mixing boards, digital video recorders, content storage networks, streaming servers, or any other type and form of media source delivering a single media stream. Each media stream 120 may be of any type and form of streaming media protocol, such as an HTTP-Live Streaming (HLS) protocol or Real Time Streaming Protocol (RTSP) or any other such protocol, and may comprise a manifest and/or a plurality of blocks, segments, or "chunks" of media. For example, in many streaming media systems, media is recorded and encoded by the source device 100 in chunks of predetermined length, such as 1 second, 5 seconds, 10 seconds, or 15 seconds. The chunks may be compressed or encoded in a compressed format, such as any of the compression formats promulgated by the Motion Picture Experts Group (MPEG), e.g. MPEG-2, MPEG-4, MPEG-7; an adaptive audio coding (AAC) format; or any other type and form of compression protocol. Each chunk may be named or associated with an identifier (e.g. "chunk01.mpg", "chunk02.mpg", etc.) and may be provided to a storage device, cloud storage service, or streaming server 104. Client devices 106 or 108a-108b (referred to generally as client device(s) 106 or 108) may download or retrieve successive chunks of the stream, buffer or cache the chunks locally, and decode and display each chunk in order. As the chunk size may be relatively small, download and decoding time may be minimal. In a further implementation, chunks may be provided in alternate formats or resolutions (e.g. "chunk01_low-resolution.mpg", "chunk-01_high-resolution.mpg", etc.), allowing a client device or streaming server to dynamically adjust quality depending on buffer levels or transmission or processing delays.

Each media source 100 may have the ability to stream and store its media feed in a storage or streaming server or cloud for real-time use or for later download and retrieval. In some implementations, the media source may have internal media processing such as the ability to apply audio or video filters, graphical overlays, or other such features. The media source may select or apply processing at the instruction of an operator or user of the media source 100, or, in some implementations, responsive to configuration commands received from a controller 102, discussed in more detail below.

As discussed above, chunks may be provided to, stored at, and retransmitted by a streaming server 104. Streaming server 104, sometimes referred to as a streaming service, streaming cloud, cloud storage provider, or content network, may comprise one or more desktop computers, server computers, workstations, or other such devices. Streaming server 104 may comprise one or more physical machines, and/or one or more virtual machines executed by one or more physical machines. Each chunk may be stored with a unique resource identifier (URI) such that client devices may request and retrieve each successive media chunk by requesting the corresponding URI. The chunks may be transmitted via any appropriate protocol, such as the hypertext transfer protocol (HTTP) or file transfer protocol (FTP), or any appropriate streaming protocol, such as those discussed above.

Client devices 106, 108 may comprise any type and form of computing device, such as laptop computers, smart phones, tablet computers, wearable computers, desktop computers, video game consoles, smart televisions, set-top boxes, or any other type and form of computing device capable of retrieving and decoding a media stream. The client devices 106, 108 may execute an application for retrieving and decoding the media stream, such as a web browser or a dedicated media player application. In some implementations discussed in more detail below, the client devices may execute a processing or mixing application capable of retrieving one or more media streams and executing modifications according to a configuration file provided by a controller 102.

As discussed above, in instances in which a single media source creates a single stream and broadcasts the stream to one or more client devices 106, 108, the devices may simply retrieve the next chunk iteratively. However, if multiple media sources 100 exist, the client devices may not be able to switch between sources easily. For example, while some client devices may execute a plurality of web browsers to view a corresponding plurality of media streams simultaneously, this may not be possible on many devices such as tablet computers or wearable devices. Additionally, the user may not wish to view all of the streams simultaneously, but may wish to dynamically select between them. In a similar instance, a producer or director may wish to dynamically select between a plurality of media streams 120 to provide to an audience of client devices. Current web browsers lack the functionality to switch dynamically between media streams.

Accordingly, in one implementation, a controller 102 may be deployed to manage processing and configuration of the media streams to allow dynamic selection and mixing. The controller 102 may comprise any type and form of computing device, including a laptop computer, desktop computer, tablet computer, wearable computer, smart phone, or other such device. The controller 102 may transmit commands or requests to control starting and stopping of individual media streams 120 to provide a mixed stream 130 to client devices 108, without any required modifications to applications on client devices 108.

In one implementation, the controller 102 may receive media previews 125 of each media stream 120. In some implementations, previews 125 may be in a lower resolution to reduce bandwidth and processing requirements. The controller 102 may display the previews 125 to a user or producer, allowing them to select between different media streams 120. Responsive to selection of a different media stream (e.g. by tapping, clicking, or otherwise selecting a media stream within a user interface provided by the controller 102), the selected media stream 120 may be provided as the mixed stream 130 to client devices 108.

Figure 1B:
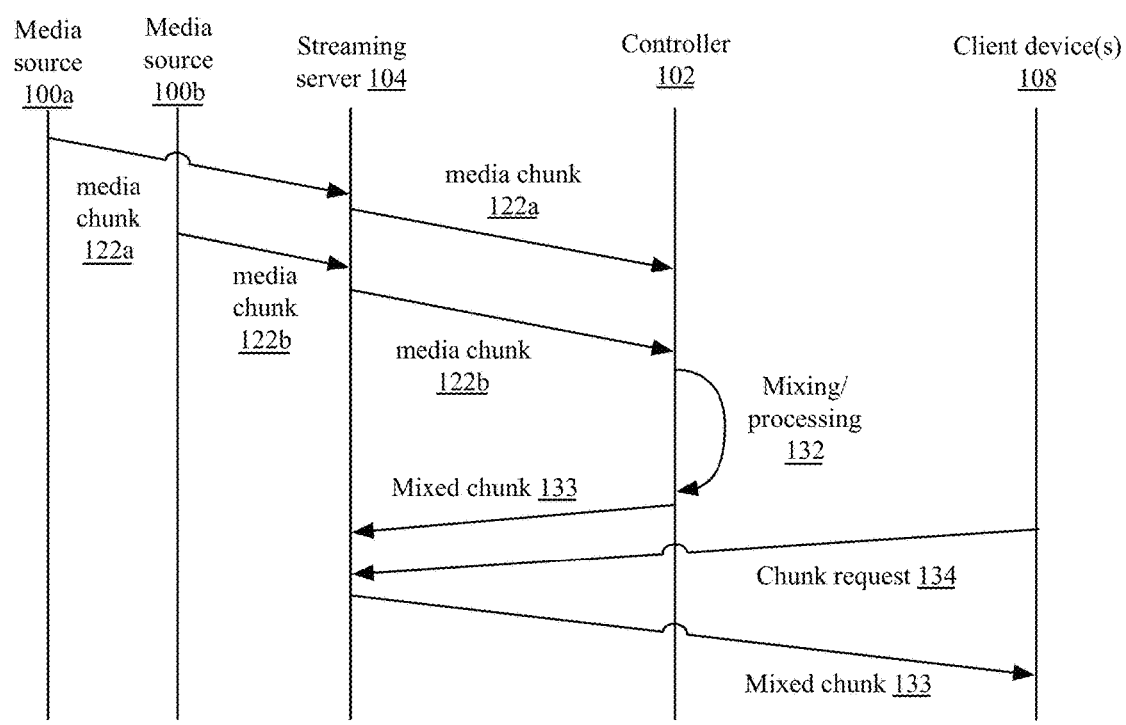
FIG. 1B is a signal flow diagram of an embodiment of a multi-device media broadcasting system with active control.

For example, referring ahead to FIG. 1B, illustrated is a signal flow diagram of an embodiment of a multi-device media broadcasting system with active control. Each media source 100a, 100b may transmit corresponding chunks of media 122a, 122b to a streaming server 104. The controller 102 may retrieve the media chunks 122a, 122b or a preview version of the chunks as discussed above. In one implementation, the controller 102 may perform mixing or processing of the chunks at step 132, such as selecting one chunk for output, or mixing two chunks together in split-screen or picture-in-picture formats. Processing the chunks may include decoding the chunks, applying filters, adding overlays, mixing frames together, and/or re-encoding an output stream. In some implementations, the controller may transmit the mixed, selected, or processed chunk 133 back to the streaming server 104. Responsive to client requests for the chunk 134, the streaming server may provide the mixed chunk 133 to the client devices for decoding and display. These implementations may be referred to generally as controller-processed implementations.

In a similar implementation, to reduce the time required to download high resolution chunks to the controller and upload a high resolution mixed chunk 133 to the streaming server, mixing and processing may be performed by the streaming server 104. For example, as discussed above, low resolution previews may be provided to the controller. A producer may use a user interface on the controller to select sources, apply filters or overlays, etc. The controller 102 may generate a configuration file containing instructions corresponding to the selected sources, filter applications, and overlays. The file may be an XML, file, text file, data string, or any other type and form of configuration file. For example, in one implementation, the configuration file may comprise a representational state transfer (RESTful) request, such as an HTTP POST or GET request comprising a URL including parameter-value pairs corresponding to sources and/or filters or other processing instructions (e.g. POST www.example.com/stream.php?source=camera1&color=bw&audiovolume=5, etc.). The streaming server 104 may apply processing based on the instructions and may output processed and/or mixed chunks 133 for retrieval by client devices 108. These implementations may be referred to generally as controller-produced or server-processed implementations. In a further implementation, the controller 102 may transmit configuration instructions to media sources 100 to modify processing on individual streams (e.g. color, volume, contrast, resolution, overlays, etc.) and may transmit separate configuration instructions to the server to select between media streams from the sources (e.g. camera1, camera2, etc.).

Returning to FIG. 1A, as discussed above, the controller 102 may provide a single mixed stream 130 to the streaming server 104, in some implementations, which may then be retransmitted to client devices 108. In other implementations, the controller 102 may provide configuration instructions 135 to the server 104 and/or media sources 100 to control generation of the mixed stream 130. In some of the latter implementations, chunk renaming may be used to dynamically select among media sources to provide a transparently edited stream to client devices 108.

For example, and referring briefly ahead to FIG. 4A, as discussed above, in many implementations, streaming media may be provided to or retrieved by client devices according to a manifest 400. Manifest 400 may comprise retrieval instructions for chunks of a media file, such as URI(s) or other identifiers 402a-402n and/or times or durations of each chunk 404a-404n. For live broadcasts, manifest 400 may comprise identifiers of a naming system or scheme for chunks, without needing to explicitly identify each chunk. For example, manifest 400 may indicate that five second chunks of the stream may be retrieved from a specified URL (e.g. http://www.example.com/stream/chunk_n.mpg) where n is consecutively incremented every 5 seconds. Accordingly, the client device may transmit successive requests (e.g. for chunk_1.mpg, chunk_2.mpg, chunk_3.mpg, etc.), and buffer and/or decode for presentation each chunk as necessary.

Figure 4B:
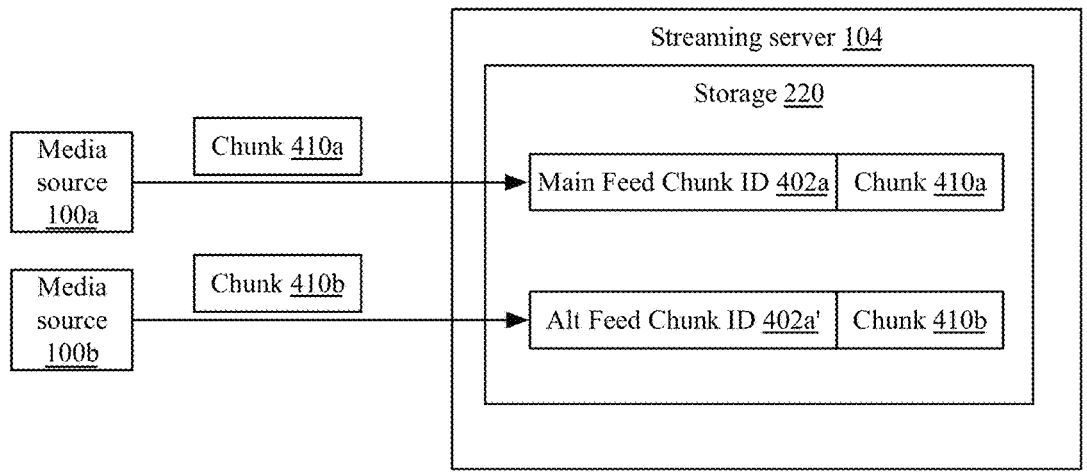
FIGS. 4B and 4C are illustrations of multi-device media broadcasting, according to an implementation of the embodiment of FIG. 1C.

Different media streams may be provided to the client device by dynamically adjusting chunk names or identifiers 402, without adjusting the manifest or naming scheme provided to the client device. For example, referring now to FIG. 4B, illustrated are two media sources 100a, 100b, each providing a media chunk 410a, 410b to a streaming server 104, each chunk representing the same period in time. The streaming server may associate the chunk 410a from the first media source 100a with an identifier for a main feed chunk 402a. The streaming server may associate the chunk 410b from the second media source 100b with an identifier for an alternate feed chunk 402a'.

Figure 4C:
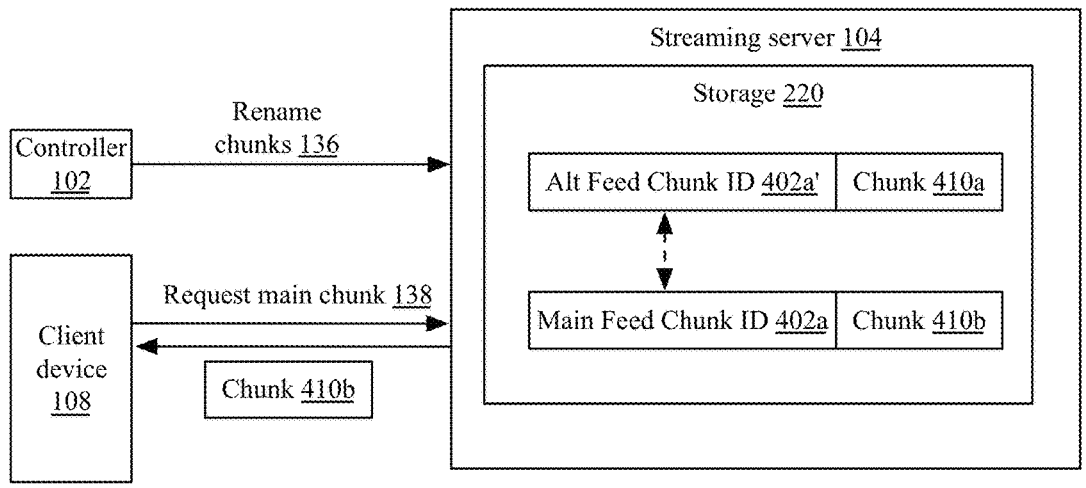

Referring now to FIG. 4C, a controller 102 may transmit a request or instructions 136 to rename the chunks. The request may be in any format, and may be very lightweight in some implementations (a single packet with a flag in an options field indicating to swap the media sources, for example; or a RESTful request with a parameter-value pair identifying the media source to make "active" or associate with a main feed ID). Responsive to receipt of the instructions, the streaming server may swap or replace the main and alternate feed identifiers as shown, without swapping the corresponding chunks. Accordingly, when a client device 108 subsequently requests a next chunk of the "main" feed, the server will respond with chunk 410b, rather than chunk 410a as in FIG. 4B.

Figure 1C:
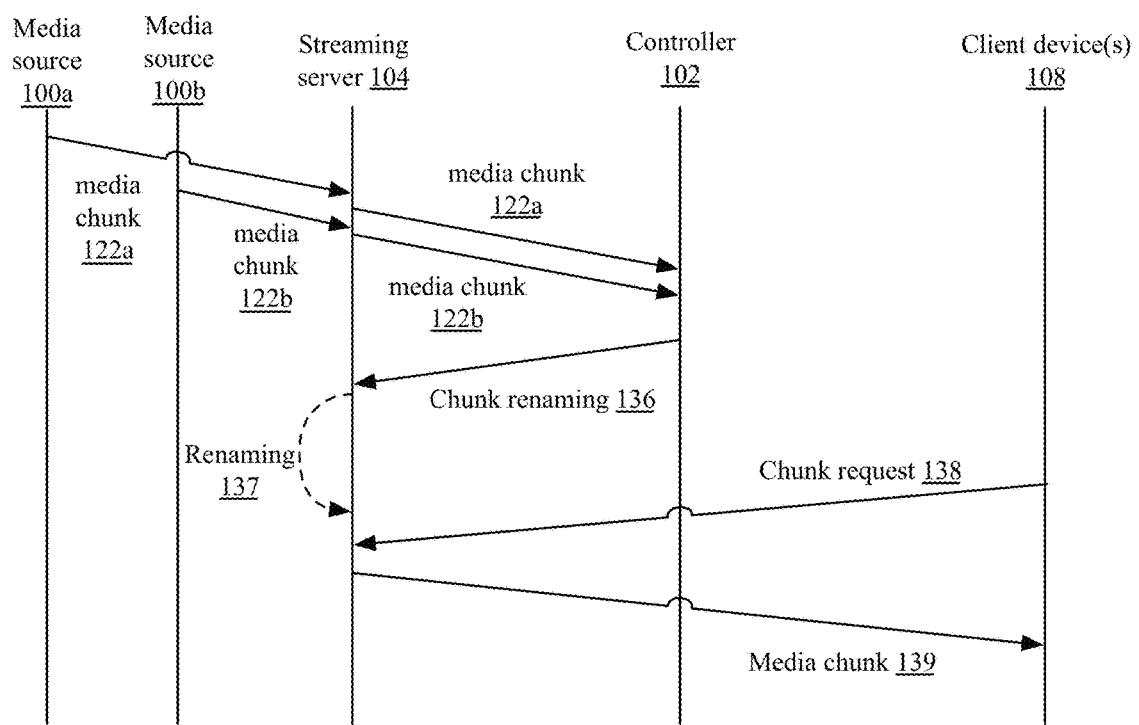
FIG. 1C is a signal flow diagram of another embodiment of a multi-device media broadcasting system with active control.

FIG. 1C is a signal flow diagram of an embodiment of a multi-device media broadcasting system utilizing chunk renaming. As discussed above, one or more media sources 100 may transmit media chunks 122 to a streaming server 104, each set of media chunks corresponding to the same period in time. The streaming server may provide the chunks or a preview version to a controller 102. Responsive to a selection of a source by an operator or producer of the controller, the controller may transmit renaming or swapping instructions 136 to the streaming server, which may rename the chunks at step 137 or replace or swap identifiers or URIs associated with the chunks to associate a chunk of the selected source with the main feed identified in a manifest provided to client devices 108 for the mixed stream. The client device may transmit a request 138 for a next chunk according to the manifest (e.g. at the next identified URI), and the streaming server 104 may respond with the renamed or re-associated chunk 139 from the selected media source. Although discussed in terms of a single or "main" feed, the above methods may be extended to dynamic control of multiple feeds (e.g. main, alternate, "audience", "stage", "backstage", "sidelines", etc.).

Figure 4D:
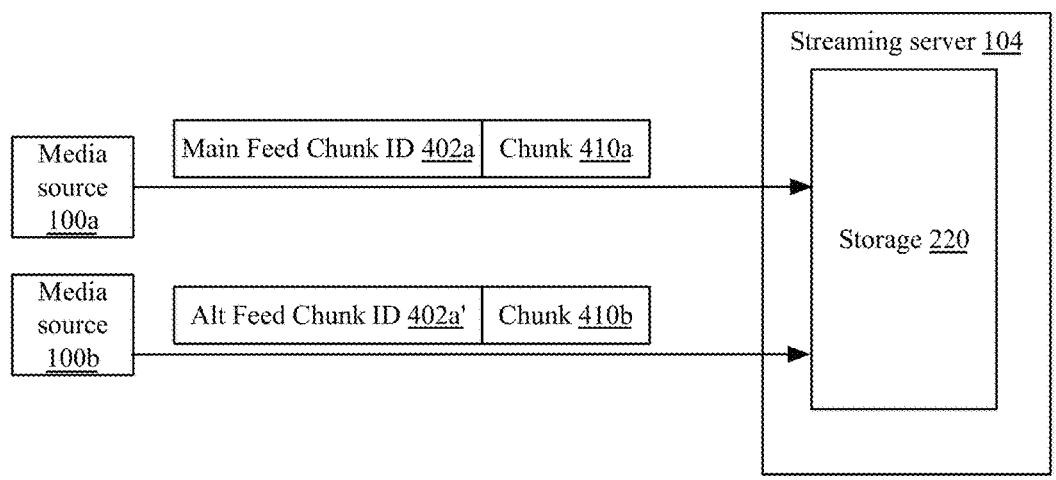
FIGS. 4D and 4E are illustrations of multi-device media broadcasting, according to another implementation of the embodiment of FIG. 1C.

In another implementation, renaming may be performed by the media sources 100 responsive to requests or instructions from the controller. For example, referring now to FIG. 4D, each media source may provide a URI or other identifier 402 associated with media chunks of the stream. For example, a first device may be associated with a device identifier or name (e.g. "camera 1") and may generate a stream of media chunks (e.g. "camera1_chunk1.mpg", "camera1_chunk2.mpg", etc.). A second device may be associated with a different device identifier or name (e.g. "camera 2") and may generate a second stream of media chunks (e.g. "camera2_chunk1.mpg", "camera2_chunk2.mpg", etc.). Each stream of chunks may be provided to and stored by the streaming server 104.

Figure 4E:
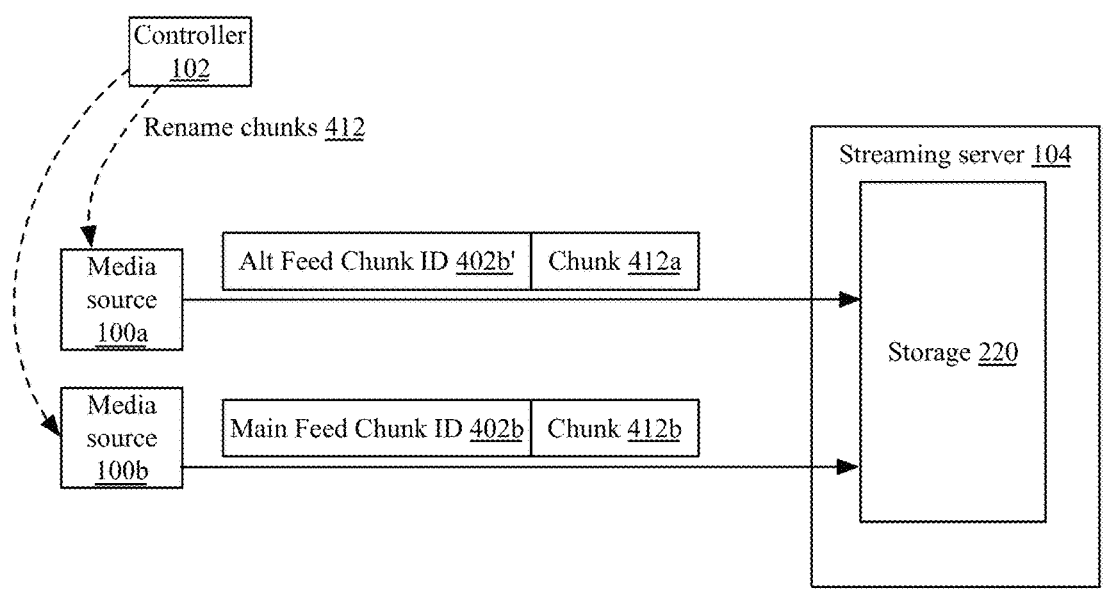

Referring now to FIG. 4E, responsive to a selection by an operator, the controller 102 may transmit chunk renaming instructions 412 to one or more media sources 100. The media sources may generate subsequent chunks with different names or identifiers according to the controller's instructions. For example, at a first time, the operator may select the first media source to be the main output, and the controller may send a selection or "take" command to the first media source. The media source may generate subsequent chunks with a predetermined identifier, such as "main_chunk1.mpg", "main_chunk2.mpg", etc. Subsequently, at a second time, the operator may select the second media source to be the main output. The controller may send a first instruction to the first media device to cause it to generate subsequent chunks with a default identifier (e.g. "camera1_chunk3.mpg"); and may send a second instruction to the second media device to cause it to generate subsequent chunks with the predetermined identifier (e.g. "main_chunk3.mpg"). Accordingly, a client device with a manifest identifying URIs with "main_chunkn.mpg" may retrieve the first two chunks provided by the first media source and the third chunk provided by the second media source, without any modifications to the manifest, and transparently to any application or media player executed by the client device.

Returning briefly to FIG. 1A, in another implementation, a smart viewer application on a client device 106 may perform mixing or processing according to instructions in a configuration file 135 from a controller 102. While such implementations may require specialized software on the client device 106, they may also take advantage of high speed connections or processing resources of the client device. The client device 106 may request a configuration file via an application programming interface (API) 140, and may receive a manifest identifying a stream and/or instructions for manipulating or modifying the stream according to a producer's inputs at the controller 102. For example, the producer may select two sources to provide via split-screen, and an additional overlay image. An instruction file may be generated and provided to the streaming server 104 and/or client device 106. The instruction file may direct the client device to download chunks 145 from the two sources and the overlay image from the streaming server 104 or another content network; locally mix the two chunks into a split-screen format; apply the overlay image; and display the result to a user. These implementations may be referred to as client-processed implementations.

Figure 1D:
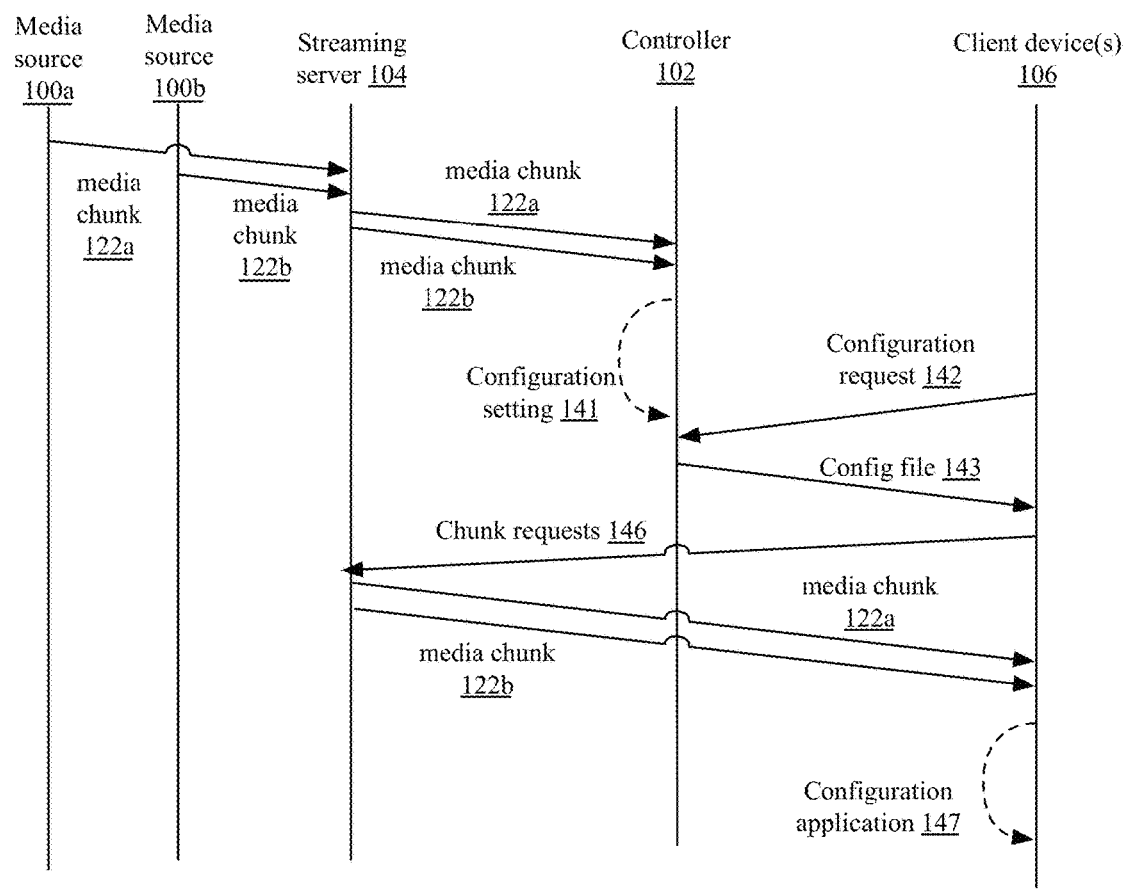
FIG. 1D is a signal flow diagram of still another embodiment of a multi-device media broadcasting system with active control.

For example, FIG. 1D is a signal flow diagram of a client-processed implementation of a multi-device media broadcasting system with active control. As discussed above, media sources 100 may provide media chunks 122 to a streaming server 104, which may provide the chunks or preview versions of the chunks to a controller 102. At step 141, an operator of the controller may select a stream, select processing parameters, or perform other functions, and the controller may generate configuration instructions.

In some implementations, a client device 106 may transmit a configuration request 142 to the controller 102, and may receive a configuration file or instructions 143. In other implementations, the configuration file or instructions may be provided to the streaming server by the controller, and the client device 106 may retrieve the configuration instructions from the server 104. The client device 106 may then request one or more chunks 146 according to the configuration file, retrieve the chunks, and apply the configuration instructions at step 147.

In a similar implementation, either the operator of the controller 102 or the user of the client device 106 may control editing or selection of an active feed or feeds. For example, the producer may select to switch among various sources for a "broadcast" or main feed. A user may watch the main feed on their client device 106, and at some point, decide to select a different media source than that selected by the producer. Through an interface similar to the producer's interface, the user may select a different media source. The media player on the client may select subsequent chunks based on the selected media source. For example, as discussed above, in some implementations as a producer or operator of controller 102 selects different media sources, media chunks from each selected source may be identified with the same URI or identifier (e.g. "main_chunk1.mpg", "main_chunk2.mpg", etc., which may come from the same or different media sources). The media player of the client device 106 may accordingly request subsequent chunks with the same URI scheme transparently to changes made by the producer. However, should the user of the client device 106 decide to "switch away" from the main feed and select, for example, "camera 1", responsive to selection of the corresponding media source by the user, the media player may select a subsequent chunk based on the URI associated with the media source rather than the main feed (e.g. "camera1_chunk3.mpg"). In a further implementation, rather than switching URIs or identifiers as each media stream is selected to be the active stream, a media stream may be identified by two URIs or identifiers—its own identifier based on the device identifier of the media source (e.g. "camera1", "camera2", "vtr1", etc.) as well as an identifier associated with a main or alternate mixed broadcast stream (e.g. "main" or "alt"). Accordingly, a user of a client device 106 may choose to receive the mixed or "main" broadcast provided by a producer, or select to receive a media stream from a selected source, even when the selected source is also the active source for the main broadcast.

Figure 5C:
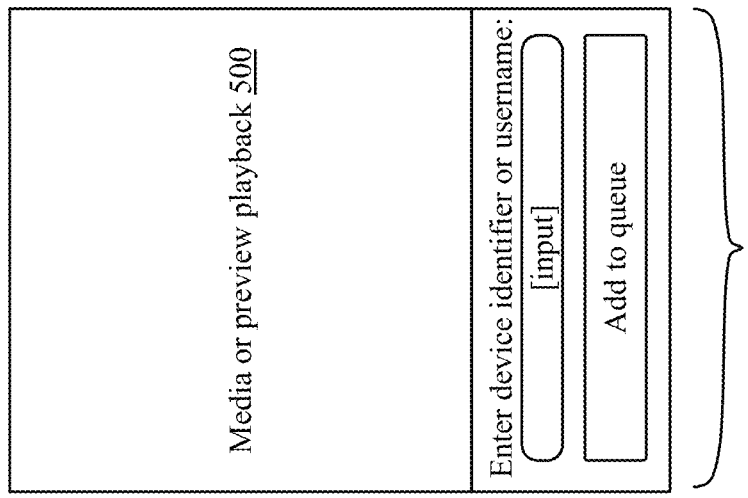
FIGS. 5A-5C are illustrations of embodiments of a user interface for a smart media player or a stream controller.
Figure 5B:
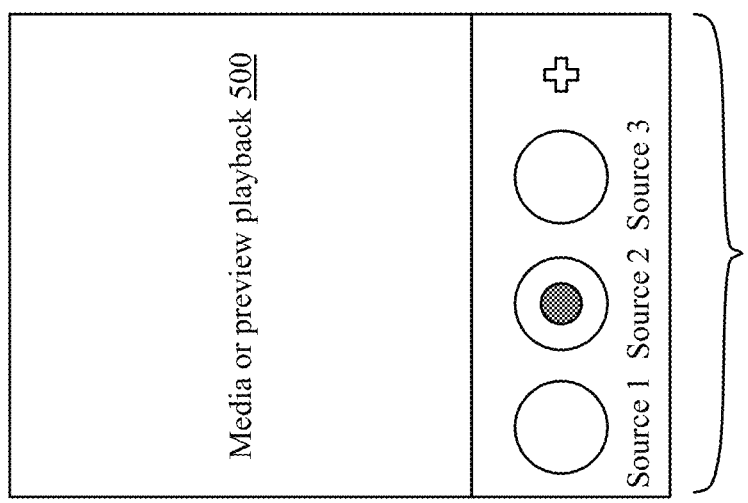
Figure 5A:
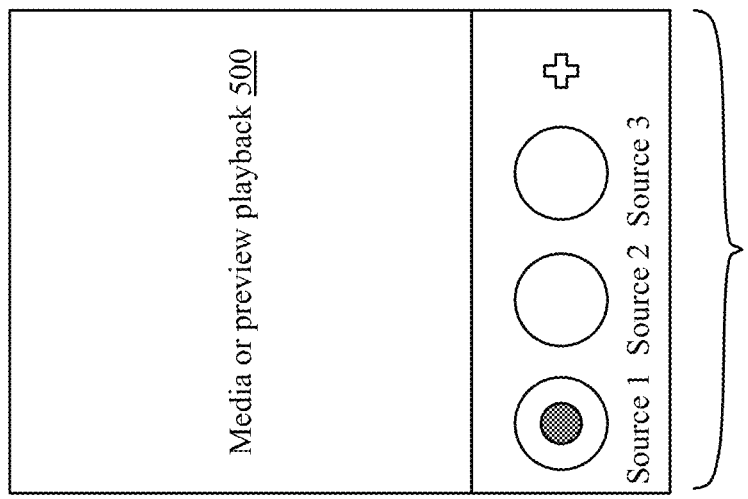

Referring briefly to FIGS. 5A-5C, illustrated are embodiments of a user interface for a smart media player of a client device 106 or a stream controller of a controller 102. Referring first to FIG. 5A, in one implementation, the user interface may include a media or preview playback window 500, which may display received and decoded media chunks. Although shown in a portrait orientation, in many implementations, the preview or playback window 500 may be in a landscape format, or may dynamically change depending on the resolution and format of the input media stream.

The user interface may also include one or more controls 502, such as selectors for different media streams and/or incorporation of additional media streams. For example, as shown, three media streams of three media sources may be identified with corresponding buttons or icons. A first media source (e.g. source 1) may be shown with a highlighted or marked button or icon, indicating the media source is active. If the user selects a different source (e.g. media source 2), the user interface may change as shown in FIG. 5B, and the device may display decoded media chunks of the media stream or preview stream associated with the corresponding source. In some implementations, if additional sources exist, the controls 502 may be scrolled or a next or previous page of controls may be selected.

The user interface may also, in some implementations, allow addition of media sources (e.g. via a plus shaped button or icon). Upon selection of the button, the controls 502 may be replaced by controls 504 as shown in the illustration of FIG. 5C. Controls 504 may allow a user to input a device identifier of a media source, a username of a user associated with the media source, an address of a media source, or any other such information. Upon entry in some implementations, the media player or stream controller may request and retrieve media chunks or low-resolution preview media chunks of a media stream associated with the entered device identifier, and decode and display the retrieved media chunks in display 500. Once the user confirms the media source, they may select to add the media source to a queue or set of media sources selectable via controls 502. As discussed above, although discussed as media sources, in some implementations, the user interface may allow selection between mixed feeds (e.g. a main feed, alternate feed, sideline feed, etc.) and/or individual media sources.

Figure 2A:
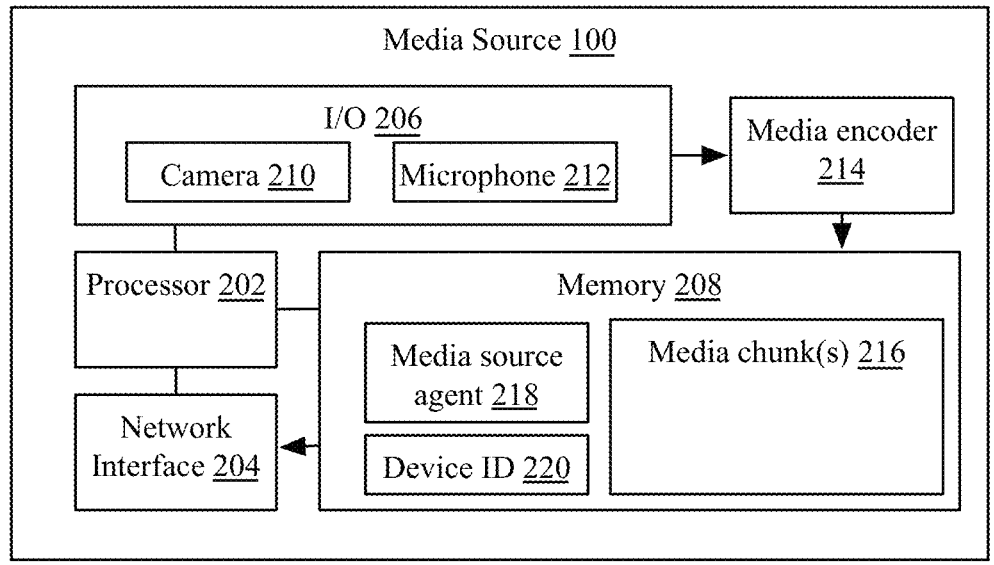
FIGS. 2A-2D are block diagrams of embodiments of media sources, streaming servers, controllers, and client devices.

FIG. 2A is a block diagram of an embodiment of a media source device 100. Media source 100 may comprise a laptop computer, desktop computer, wearable computer, portable computer, smart phone, tablet computer, network camera, or any other type and form of computing device capable of encoding and streaming media. In some implementations, a media source 100 may not include all of elements 202-220 illustrated, or may include a plurality of any of elements 202-220 or other elements. For example, in one implementation, a media source 100 may comprise a plurality of network interfaces 204. Furthermore, although illustrated as a single device, in many implementations as discussed above, a media source 100 may comprise a plurality of media sources 100 in communication via a network, such as a video mixer and a plurality of cameras, or any other combination of these or other devices. In some implementations, a media source 100 may comprise a virtual device or virtual machine, executed by a physical machine.

A media source 100 may include one or more processors 202. A processor 202 may comprise a central processing unit (CPU), microprocessor, application-specific instruction-set (ASIC) processor, or any other type and form of processor for recording, processing, encoding, and transmitting media. A processor 202 may communicate with one or more network interfaces 204, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 204 may be used for transmitting media streams and receiving configuration files, or any other such functions. Network interfaces 204 may communicate with streaming server(s) and/or controller(s) via a network (not illustrated), which may comprise any type and form of network or networks, including a LAN and/or WAN such as the Internet. For example, in many implementations, a media source 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

A media source 100 may comprise one or more input/output interfaces 206. An input or output interface 206 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface. In many implementations, as shown, a media source 100 may include or communicate with one or more cameras 210 and/or microphones 212. Cameras 210 may comprise any type and form of cameras, including visible light cameras, infrared cameras, ultraviolet or "night vision" cameras, or any other sort of camera. In some implementations, a plurality of cameras may be deployed, e.g. for binocular or 3D vision. Microphones 212 may comprise any type and form of microphone, including dynamic, condenser, or electrostatic microphones, or any other sort of microphone. In some implementations, a plurality of microphones may be deployed, e.g. for high directionality or active noise cancellation, or for surround, stereo, or binaural audio.

Media source 100 may comprise one or more media encoders 214. In some implementations, media encoders may comprise hardware circuits, software, or a combination of hardware and software. Media encoders 214 may include analog amplifiers or filters, analog to digital converters (ADC), digital signal processors (DSP), and one or more encoders for a media compression format, such as any MPEG protocol, AAC, H.264, H.265, Advanced Video Codec (AVC), High Efficiency Video Codec (HVEC), or any other such protocol or compression format. Media encoders 214 may receive media from a camera and/or microphone and process and/or encode the media into a compressed and streamable format, such as via a plurality of media chunks (216), which may be in any preferred format.

A media source 100 may comprise one or more memory devices 208. Memory 208 may comprise any type and form of memory or storage, including random access memory (RAM), hard drive storage, solid state drive storage, flash memory, optical or magneto-optical storage, tape storage, or any other type and form of storage device.

Media source 100 may execute a media source agent 218. Media source agent 218 may comprise an application, server, service, daemon, routine, or other executable logic for streaming media chunks 216 via a streaming protocol (e.g. HLS, RTSP, etc.) to a streaming server and/or controller 102. Media source agent 218 may also receive configuration requests or files from a streaming server or controller, and may modify chunk naming conventions and/or processing of media chunks by media encoder 214.

Media source 100 may be associated with a device identifier 220. Device identifier 224 may comprise a device name, user name, media access control (MAC) address, Internet Protocol (IP address), alphanumeric string, or any other data for identifying the media source 100. In some implementations, media chunks 216 may be identified with device identifier 220, such as "camera1_chunk1.mpg" or "main_chunk1.mpg".

Figure 2B:
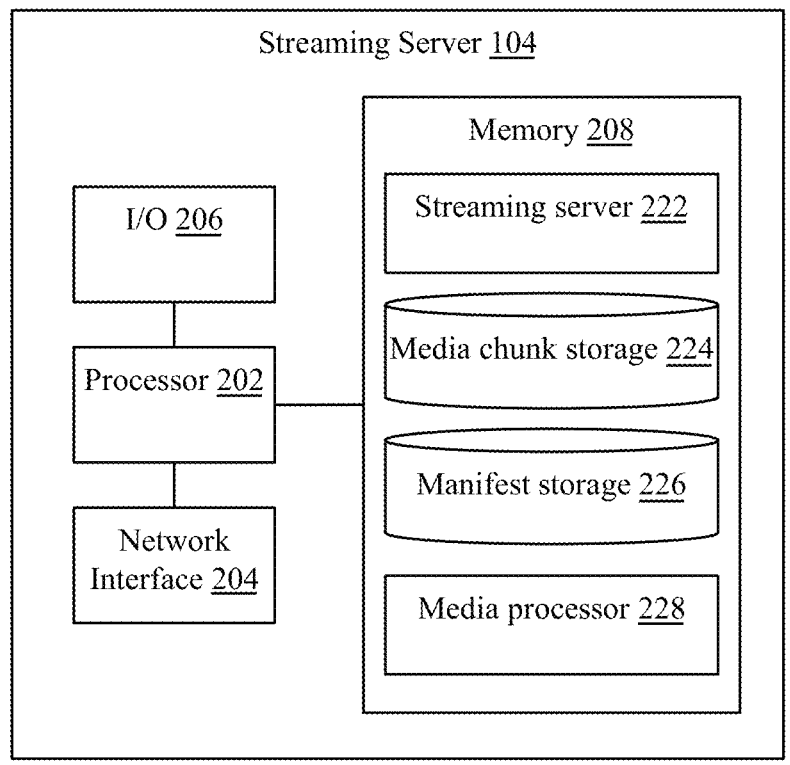

FIG. 2B is a block diagram of an implementation of a streaming server 104. As discussed above, a streaming server 104 may comprise one or more physical and/or virtual computing devices, and may be referred to as a cloud storage network, content delivery network, or any other such term. The streaming server 104 may comprise a cluster or farm of servers or appliances. Although shown together, in many implementations, parts of streaming server 104 may be distributed across a plurality of machines (e.g. processing devices and storage devices). As with media sources 100, the streaming server may comprise one or more processors 202, network interfaces 204, input/output interfaces 206, and memory devices 208.

Streaming server 104 may execute a similarly named streaming server 222, which may comprise an application, service, server, daemon, routine, or other executable logic for providing streaming media to one or more client devices. Although frequently referred to together, in some implementations, for distinction or clarity, the hardware executing streaming server 222 may be referred to as a streaming server device 104. Server 222 may comprise a web server, file server, RTSP server, or any other type and form of server, typically operating at a layer of the network stack above the transport layer (although in some implementations, server 222 may comprise lower layer functions, such as for quality of service (QoS) management).

Media chunks received from media sources may be stored in media chunk storage 224, which may be stored within the memory 208 of a streaming server 104, or may be distributed among a plurality of storage devices or appliances. As discussed above, each media chunk may be associated with an identifier and a manifest. Manifests may be stored together with chunks or separately, e.g. in manifest storage 226.

In some implementations, such as with server-processed implementations, streaming server 104 may execute a media processor 228. Media processor 228 may comprise an application, service, server, daemon, routine, or other executable logic for processing media, including decoding and encoding media, transcoding media, adjusting resolution or bit depth of media, applying filters, mixing a plurality of media streams (e.g. split screen, picture-in-picture, mixing audio, etc.), adding overlay graphics, text, or icons, or performing any other such processing. In some implementations, media processor 228 may comprise one or more hardware units, including circuitry for encoding and decoding media, DSP, summing amplifiers, or any other such circuits.

Figure 2C:
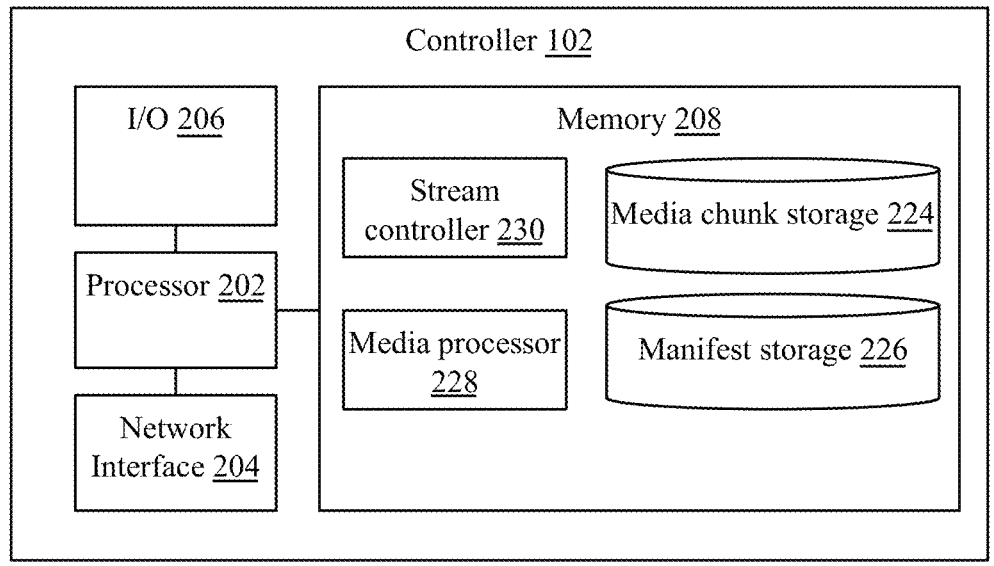

FIG. 2C is a block diagram of an implementation of a controller 102. As discussed above, controller 102 may comprise a laptop computer, desktop computer, tablet computer, wearable computer, smartphone or any other type and form of computing device. As with media sources 100, the controller may comprise one or more processors 202, network interfaces 204, input/output interfaces 206, and memory devices 208. Additionally, as with the streaming server, the controller 102 may comprise media chunk storage 224, manifest storage 226, and/or a media processor 228. Controller 102 may also execute a stream controller 230. Stream controller 230 may comprise an application, service, server, daemon, routine, or other executable logic for displaying media streams or previews of streams, and for allowing an operator or producer to select streams for a main or mixed stream; select, modify parameters of, and apply filters; add text or graphics to a stream; or perform any other such functions. Stream controller 230 may process media streams directly, or may generate instructions or configuration files as discussed above for transmission to client devices 106, server 104, and/or media sources 100 to apply filter parameters, rename chunks, etc.

Figure 2D:
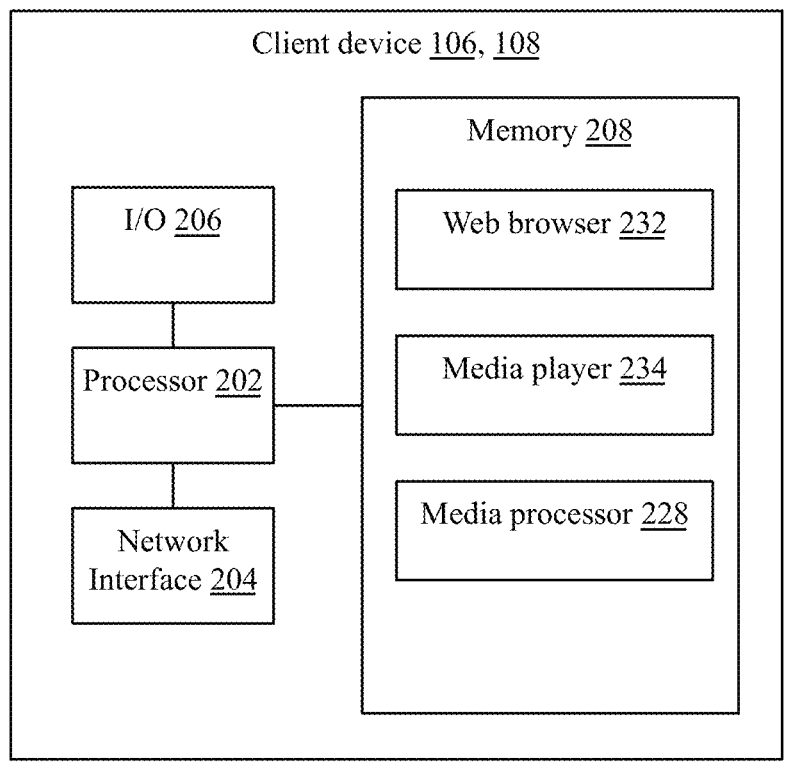

FIG. 2D is a block diagram of an implementation of a client device 106, 108. As discussed above, client devices 106, 108 may comprise a laptop computer, desktop computer, tablet computer, wearable computer, smartphone, smart television, set-top box, video game console, or any other type and form of computing device. As with media sources 100, the client devices 106, 108 may comprise one or more processors 202, network interfaces 204, input/output interfaces 206, and memory devices 208. In some implementations, such as with client-processed implementations discussed above, a client device 106 may comprise media chunk storage 224 and manifest storage 226 (not illustrated), and/or a media processor 228. Client device 106, 108 may execute an application, such as a web browser 232 or a standalone media player 234.

Figure 3:
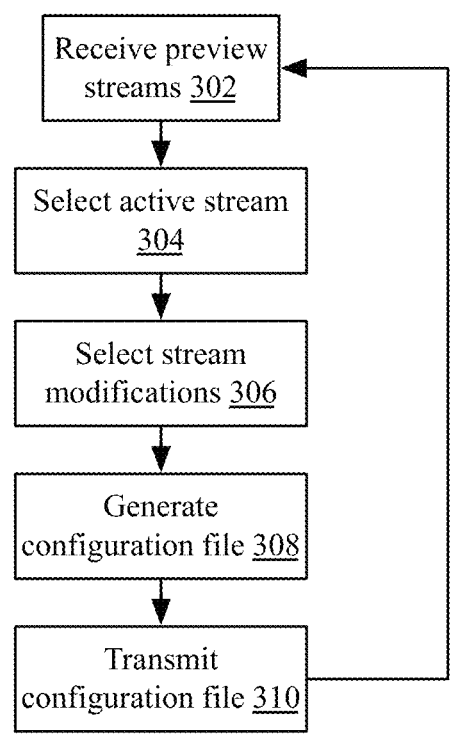
FIG. 3 is a flow chart of an embodiment of a method for multi-device media broadcasting with active control.

FIG. 3 is a flow chart of an embodiment of a method for multi-device media broadcasting with active control. At step 302, a controller may receive media streams and/or reduced quality preview streams from one or more media sources. As discussed above, the controller may receive the streams or preview streams in the form of one or more media chunks via a streaming protocol, and may receive or retrieve the chunks via a streaming server.

At step 304, in some implementations, the controller or an operator of the controller may select a stream to be the active stream for a mixed feed. Selection of the stream may be via a user interface provided by the controller. At step 306, in some implementations, the controller or an operator of the controller may also select one or more modifications to apply to the selected active stream, such as overlay text or graphics, modifications to filters or pre-processing, or any other features.

At step 308, the controller may generate a configuration file or instructions to the streaming server, media sources, and/or a client device. The configuration file may include instructions for editing or mixing the media sources, instructions for renaming media chunks or switching URIs or identifiers, and/or instructions for applying filters or other modifications. In some implementations, different configuration files may be generated and sent to different devices. As discussed above, in some implementations, instructions may be provided via a RESTful protocol and accordingly, the configuration "file" may be a request packet. At step 310, the controller may transmit the configuration file or instructions to one or more devices, depending on implementation, as discussed above.

Additionally, although described primarily in terms of live streaming media, media may also be stored (e.g. in a content network or storage of streaming server 104, at the source devices 100, and/or at client devices 106, or in other storage locations) for playback at a later time. This may include both a mixed stream as well as the individual "raw" or unmixed streams from each media source. This allows both later use as well as offline mixing. In some implementations, a controller 102 or client device 106 may be able to enable or disable recording or saving of media files or media chunks remotely via the user interface separate from enabling or disabling live streaming (or streaming of previews). Metadata may also be stored with the media files, including information regarding equipment types, dates, cameras, scenes, takes, tags, or other information. Accordingly, the above systems and methods may also be used for multi-device recording.

Additionally, media may be stored in both a chunked format as discussed above as well as complete files, in compressed or uncompressed formats. In some implementations, high resolution media data may be stored locally while compressed media is streamed, allowing later use and mixing at higher resolutions than that possible during live broadcast due to bandwidth limitations.

In some implementations, client devices 106 may also be media sources 100. For example, in an environment with many audience members, each with a client device 106, each device may also operate as a media source 100 to other client devices 106 in the environment. Devices may be enabled or disabled as media sources either locally (via a user interface), or entry into a geofenced area, in response to acceptance of a push notification via WiFi, Cellular, Bluetooth, NFC, or other such methods. For example, client devices 106 of users at a football game may also be media sources 100 for other client devices 106 at the football game: a viewer seated at one end zone may select to stream video from the camera of a smart phone of a viewer seated at the opposite end zone when the action is farther away, and vice versa. Individual audience members may choose to record (and stream) actions of individual players (e.g. that may not be normally watched by a broadcast camera, such as a defensive linesman); and other audience members may select to receive a stream from their camera, using the techniques discussed above. Similarly, producers may preview and/or record media streams from dozens, hundreds, or even thousands of audience members, providing many more potential camera angles than would be possible with traditional camera setups.

Figure 6:
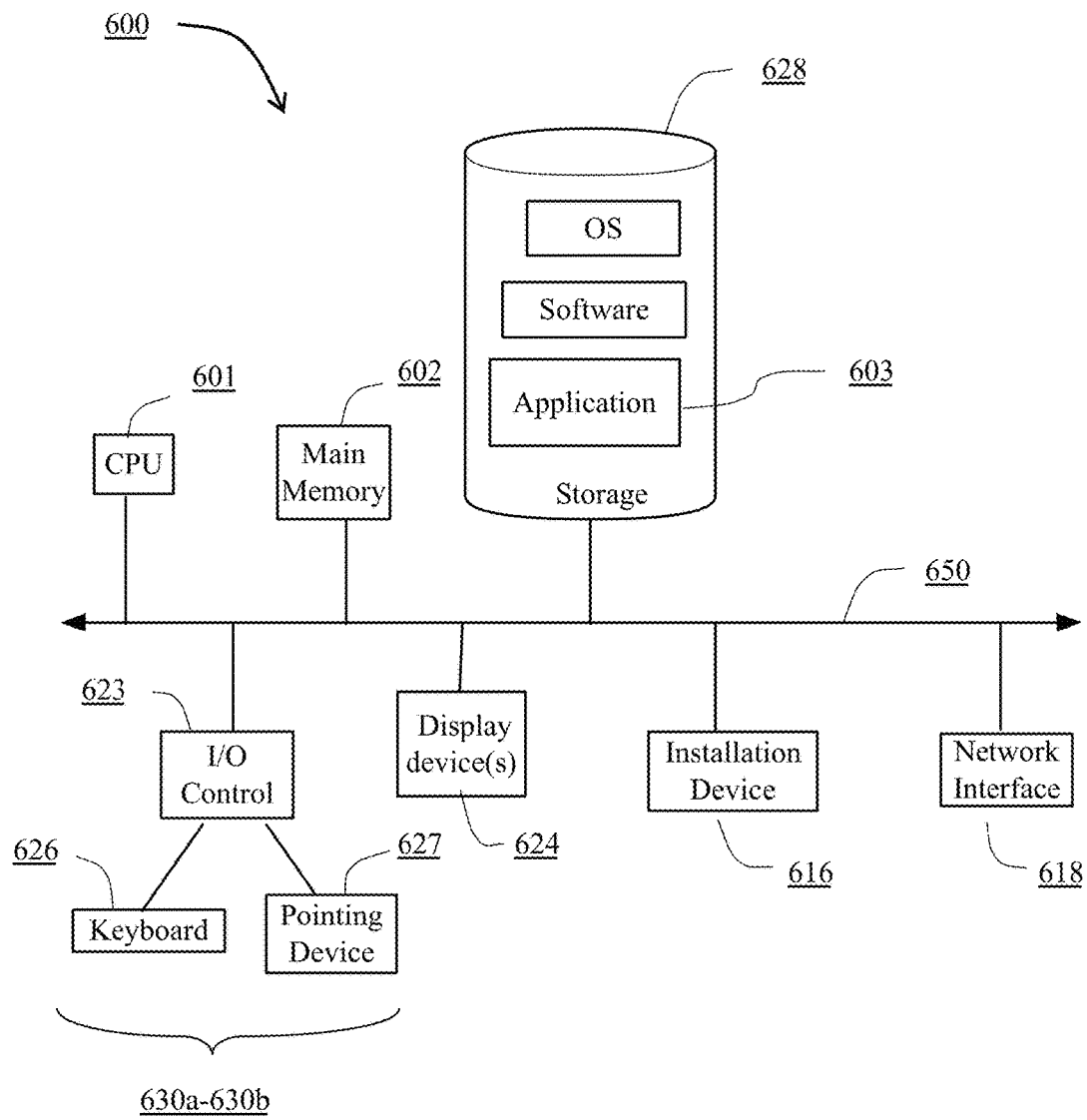
FIG. 6 is a block diagram of an exemplary computing device useful for practicing the methods and systems described herein.

FIG. 5 is a block diagram of an exemplary computing device useful for practicing the methods and systems described herein. The various devices 100, 114 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 6 depicts a block diagram of a computing device 600 useful for practicing an embodiment of the media sources, streaming servers, controllers, and/or client devices discussed above. A computing device 600 may include a central processing unit 601; a main memory unit 602; a visual display device 624; one or more input/output devices 630a-630b (generally referred to using reference numeral 630), such as a keyboard 626, which may be a virtual keyboard or a physical keyboard, and/or a pointing device 627, such as a mouse, touchpad, or capacitive or resistive single- or multi-touch input device; and a cache memory 640 in communication with the central processing unit 601.

The central processing unit 601 is any logic circuitry that responds to and processes instructions fetched from the main memory unit 602 and/or storage 628. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 602 may be one or more memory chips capable of storing data and allowing any storage location to be directly accessed by the microprocessor 601, such as random access memory (RAM) of any type. In some embodiments, main memory unit 602 may include cache memory or other types of memory.

The computing device 600 may support any suitable installation device 616, such as a floppy disk drive, a CD-ROM drive, a CD-R/RW drive, a DVD-ROM drive, tape drives of various formats, USB/Flash devices, a hard-drive or any other device suitable for installing software and programs such as any client agent 620, or portion thereof. The computing device 600 may further comprise a storage device 628, such as one or more hard disk drives or redundant arrays of independent disks, for storing an operating system and other related software, and for storing application software programs such as any program related to the client agent 620.

Furthermore, the computing device 600 may include a network interface 618 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 618 may comprise a built-in network adapter, network interface card, PCMCIA network card, card bus network adapter, wireless network adapter, USB network adapter, cellular modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 630 may be controlled by an I/O controller 623 as shown in FIG. 6. The I/O controller may control one or more I/O devices such as a keyboard 626 and a pointing device 627, e.g., a mouse, optical pen, or multi-touch screen. Furthermore, an I/O device may also provide storage 628 and/or an installation medium 616 for the computing device 600. The computing device 600 may provide USB connections to receive handheld USB storage devices such as the USB Flash Drive line of devices manufactured by Twintech Industry, Inc. of Los Alamitos, Calif.

The computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software embodied on a tangible medium, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. A video adapter may comprise multiple connectors to interface to multiple display devices 624a-624n. The computing device 600 may include multiple video adapters, with each video adapter connected to one or more of the display devices 624a-624n. Any portion of the operating system of the computing device 600 may be configured for using multiple displays 624a-624n. Additionally, one or more of the display devices 624a-624n may be provided by one or more other computing devices, such as computing devices 600a and 600b connected to the computing device 600, for example, via a network. These embodiments may include any type of software embodied on a tangible medium designed and constructed to use another computer's display device as a second display device 624a for the computing device 600. One ordinarily skilled in the art will recognize and appreciate the various ways and embodiments that a computing device 600 may be configured to have multiple display devices 624a-624n.

A computing device 600 of the sort depicted in FIG. 6 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 600 may have different processors, operating systems, and input devices consistent with the device. For example, in one embodiment, the computer 600 is an Apple iPhone or Motorola Droid smart phone, or an Apple iPad or Samsung Galaxy Tab tablet computer, incorporating multi-input touch screens. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A multi-device media broadcasting system, comprising:
a controller comprising a stream controller and a network interface in communication with a plurality of media devices and a server;
wherein the stream controller is configured to:
select a first media stream from a plurality of media streams generated by the corresponding plurality of media devices, and
generate a multi-device stream configuration file identifying the selected first media stream; and
wherein the network interface is configured to transmit the generated multi-device stream configuration file to the server, the server providing at least one additional device with a stream manifest identifying the selected first media stream responsive to receipt of the configuration file,
wherein the controller is further configured to subsequently select a second media stream from the plurality of media streams, and generate an updated multi-device stream configuration file identifying the selected second media stream; and
wherein the network interface is further configured to transmit the updated multi-device stream configuration file to the server, the server replacing a media chunk identified in the first stream manifest generated by a first media device of the plurality of media devices with a media chunk generated by a second media device of the plurality of media devices, responsive to receipt of the updated multi-device stream configuration file, the server providing the at least one additional device with media comprising the stream without adjusting the manifest or the configuration file provided to the additional device.

2. The system of claim 1, wherein the controller is further configured to generate the multi-device stream configuration file identifying media processing or additional content for inclusion by the server in the stream manifest.

3. The system of claim 1, wherein the network interface is further configured to transmit the generated multi-device stream configuration file to the server, the server producing a single media stream from the plurality of media streams responsive to receipt of the multi-device stream configuration file.

4. The system of claim 1, wherein the controller is further configured to generate the multi-device stream configuration file identifying the selected first media stream responsive to receipt of a request identifying the first media stream from a client device.

5. The system of claim 1, wherein the controller is further configured to generate the multi-device stream configuration file identifying the selected first media stream responsive to a location of a client device.

6. The system of claim 1, wherein the controller is further configured to generate the multi-device stream configuration file identifying the selected first media stream responsive to a proximity of a client device to a second device.

7. The system of claim 1, wherein the controller is further configured to generate the multi-device stream configuration file identifying the selected first media stream responsive to receipt of a request comprising a unique identifier from a client device.

8. A multi-device media broadcasting system comprising:
a first computing device comprising a streaming media server and a network interface in communication with a plurality of media devices, a controller, and a client device;
wherein the network interface is configured to:
receive, from the plurality of media devices, a corresponding plurality of media streams, and
receive, from the controller, a configuration file identifying a first media stream of the plurality of media streams; and
wherein the streaming media servers configured to generate a streaming manifest comprising an identification of a first media chunk of the first media stream, responsive to receipt of the configuration file; and
wherein the network interface is further configured to:
transmit the streaming manifest and the first chunk of the first media stream to the client device, and
receive, from the controller, an updated configuration file identifying a second media stream of the plurality of media streams;
wherein the streaming media server is further configured to replace a second chunk of the first media stream identified in the streaming manifest with a first chunk of the second media stream, responsive to receipt of the updated configuration file identifying the second media stream of the plurality of media streams; and
wherein the network interface is further configured to transmit the chunk of the second media stream to the client device in response to a request for the second chunk of the first media stream without adjusting the stream manifest transmitted to the client device.

9. The system of claim 8, wherein the network interface is further configured to transmit the chunk of the second media stream with the identifier of the second chunk of the first media stream to the client device, the client device playing the chunk of the second media stream according to the streaming manifest comprising the identifier of the second chunk of the first media stream.

10. A method for multi-device media broadcasting, comprising:
selecting, by a controller executed by a first computing device, a first media stream from a plurality of media streams generated by a corresponding plurality of media devices;
generating, by the controller, a multi-device stream configuration file identifying the selected first media stream;
transmitting, by the controller, the generated multi-device stream configuration file to a server, the server providing at least one additional device with a stream manifest identifying the selected first media stream responsive to receipt of the configuration file;
subsequently selecting, by the controller, a second media stream from the plurality of media streams;
generating, by the controller, an updated multi-device stream configuration file identifying the selected second media stream; and
transmitting the updated multi-device stream configuration file to the server, the server replacing a media chunk identified in the first stream manifest generated by a first media device of the plurality of media devices with a media chunk generated by a second media device of the plurality of media devices, responsive to receipt of the updated multi-device stream configuration file, the server providing the at least one additional device with media comprising the stream without adjusting the manifest or the configuration file provided to the additional device.

11. The method of claim 10, further comprising transmitting the updated multi-device stream configuration file to the server, the server providing the at least one additional device with a second stream manifest identifying the selected second media stream responsive to receipt of the updated multi-device stream configuration file.

12. The method of claim 10, wherein generating the multi-device stream configuration file further comprises selecting media processing or additional content for inclusion by the server in the stream manifest.

13. The method of claim 10, wherein selecting the first media stream further comprises selecting the first media stream from the plurality of media streams based on a device type, location, or proximity to a second device of the at least one additional device.

14. The system of claim 1, wherein the network interface is further configured to transmit the updated multi-device stream configuration file to the server to cause the server to change a name of the media chunk generated by the first media device to correspond to a name of the media chunk generated by the second media device, responsive to receipt of the updated multi-device stream configuration file.

15. The system of claim 8, wherein the streaming media server is further configured to replace the identifier of the media chunk of the second media stream in the streaming manifest with the identifier of the second media chunk of the first media stream by renaming the media chunk of the second media stream to correspond to a name of the second media chunk of the first media stream.

16. The system of claim 10, wherein the server provides the media chunk generated by the second media device to a client device responsive to a request for the media chunk generated by the first media device.

\* \* \* \* \*